UNITED STATES PATENT OFFICE.

NOAH WEINKLE AND ROBERT G. PADDOCK, OF SAN FRANCISCO, CALIFORNIA, ASSIGNORS TO NATURAL SODA PRODUCTS COMPANY, A CORPORATION OF CALIFORNIA.

METHOD OF REFINING URAO.

958,678.

Specification of Letters Patent.   Patented May 31, 1910.

No Drawing.   Application filed May 21, 1908.   Serial No. 434,066.

*To all whom it may concern:*

Be it known that we, NOAH WEINKLE and ROBERT G. PADDOCK, both citizens of the United States, and residents of San Francisco, in the county of San Francisco and State of California, have invented a new and Improved Method of Refining Urao, of which the following is a full, clear, and exact description.

Our invention relates to the treatment of crude, or so-called "natural" soda, produced in large quantities from alkaline lakes. The soda in question is a crystalline substance, consisting of normal and acid sodium carbonate in varying proportions, and mixed with the chlorids and sulfates of sodium, which appear as common impurities in the mass.

The ordinary process for treating such crude soda is to heat it in a furnace for the purpose of driving off its carbon dioxid ($CO_2$) so that normal carbonate ($Na_2CO_3$) remains, more or less contaminated with sand and also with sodium chlorid and sodium sulfate.

It is well-known that a solution containing sodium bicarbonate, when boiled for a short time, loses all but about 20% of the excess of carbon dioxid, and if the boiling be prolonged, the sodium bicarbonate is entirely converted into normal carbonate. It has been supposed from this data that upon boiling crude or so-called natural soda, otherwise known as "urao," the acid carbonate contained therein would be decomposed so as to form normal carbonate. We have discovered, however, that a solution of natural soda or urao can be boiled for a considerable time without converting much of the acid carbonate into normal carbonate. We have also discovered that by thus effecting the concentration of a solution of urao, fine crystals of the same substance can be produced, nearly pure.

We have made the further discovery, in line with the facts just stated, that when a solution of urao (approximating the chemical formula $Na_2CO_3 + NaHCO_3 + 2H_2O$) is treated substantially as hereinafter described, only a small part of the acid carbonate is decomposed and converted into the normal carbonate, and that the loss of carbon dioxid is, from a manufacturing standpoint, negligible; also that the product obtained by the method described below has approximately the same composition as the urao or natural soda, except that the product in question is freed from the objectionable impurities, and is therefore greatly enhanced in commercial value, as well as made more desirable in other respects.

We proceed as follows: We select a quantity of crude soda or urao, break the same into small pieces, and subject these pieces to the action of a small quantity of solution made from crude urao and water. This step mechanically removes much of the sand, clay and insoluble organic matter, the removal being effected more easily and cheaply than can be done by filtration. The crude soda, after being thus treated, is then dissolved in hot fresh water until a saturated, or nearly saturated, solution is produced. This solution is allowed to settle for a short time and is then decanted and filtered. The solution is next introduced into multiple evaporating pans, or other evaporating receptacles, and is heated by steam or by other gases, or by the application of direct heat, as described, until the crystals of purified urao are formed. These are separated from the residual mother liquor, and are drained and washed. The mother liquor retains in solution the chlorids and sulfates of sodium. From time to time the mother liquor in the evaporating pans is drawn off and quantities of fresh solution are added, care being taken to so regulate the composition of the evaporating liquid that the sodium chlorid and sodium sulfate do not accumulate to such a degree that they may be precipitated along with the carbonates.

The product obtained as above described is a fine grained crystalline substance consisting of normal sodium carbonate and acid sodium carbonate mixed together in varying proportions, but approximating the formula $Na_2CO_3 + NaHCO_3 + H_2O$. Upon removing the crystals from the evaporating vessels they may be placed in a centrifugal machine and rotated so as to remove from them all appreciable quantities of the mother liquor. They may then be lightly sprayed with fresh water and further rotated until most of the moisture contained is removed. The residual moisture is then taken up by ordinary methods of drying, leaving the urao ready for the market or ready to be worked up into other products.

It will be understood that the crude urao above mentioned is usually obtained in the form of a hard crust one or more inches in thickness, in which form it is removed from the vats by breaking into pieces which may approximate a foot square. The crude urao contains some very fine clay and more or less organic matter, and this is hard to remove from the solution by simple filtration.

In actual practice, while concentrating the solution containing the urao in process of refinement, we concentrate the solution until the crystals of normal and acid carbonate are formed while the solution is hot, but this is not necessary as we may concentrate only to the point where the crystals will form as soon as the admixture of the solution cools a few degrees. In other words, we use our discretion whether to withdraw the solution when at a sufficient degree of concentration to cause the crystals to separate while being conveyed to the filter, or to separate it at a later stage while in or upon the filter or draining apparatus. We prefer to cause the precipitation to take place in a vessel as above described, but do not limit ourselves thereto.

Having thus described our invention, we claim as new and desire to secure by Letters Patent:

1. The method herein described of treating crude urao which consists in breaking the same into small pieces, washing said pieces with a strong solution of urao to mechanically remove insoluble and organic matters, dissolving in water the pieces thus treated clearing the solution by settling, decanting and filtering, evaporating the solution by boiling to form crystals of refined urao, and separating said crystals from the residual liquor.

2. The method herein described of treating crude urao containing chlorids and sulfates of sodium, which consists in breaking the same into small pieces, removing insoluble and organic matter, dissolving said pieces in water to form a solution, evaporating by boiling to a density allowing refined urao to precipitate, and drawing off the chlorids and sulfate in the residual liquor.

3. The method herein described, of treating crude urao, which consists in breaking the same into small pieces, washing said pieces with a strong solution of urao to mechanically remove therefrom insoluble and organic matter, dissolving said pieces in hot fresh water, clearing the solution by settling, decanting and filtering, evaporating said solution by boiling the same by the application of heat thereto, so as to separate carbonates of sodium from the hot mother liquid, drawing off the chlorids and sulfates of sodium and other impurities in said mother liquor, and finally removing the precipitated crystals of sodium carbonates and drying the same by centrifugal action.

In testimony whereof we have signed our names to this specification in the presence of two subscribing witnesses.

NOAH WRINKLE.
ROBERT G. PADDOCK.

Witnesses:
P. J. O'DEA,
PHIL. S. MONTAGUE.